(12) United States Patent
Bae et al.

(10) Patent No.: US 6,670,305 B2
(45) Date of Patent: Dec. 30, 2003

(54) FREE-STANDING MONOLITHIC CATALYST WITH MICRO-SCALE CHANNEL DIMENSIONS

(75) Inventors: Joong-Myeon Bae, Naperville, IL (US); John David Carter, Bolingbrook, IL (US); Michael Krumpelt, Naperville, IL (US); Shabbir Ahmed, Naperville, IL (US)

(73) Assignee: The University of Chicago, Chicago, IL (US)

( * ) Notice: Subject to any disclaimer, the term of this patent is extended or adjusted under 35 U.S.C. 154(b) by 373 days.

(21) Appl. No.: 09/851,843

(22) Filed: May 9, 2001

(65) Prior Publication Data

US 2002/0169077 A1 Nov. 14, 2002

(51) Int. Cl.[7] .............................................. B01J 21/04
(52) U.S. Cl. .............................. 502/527.11; 502/527.12
(58) Field of Search ........................ 502/527.11, 527.12

(56) References Cited

U.S. PATENT DOCUMENTS

| | | | | |
|---|---|---|---|---|
| 4,521,532 A | * | 6/1985 | Cho ........................... | 502/439 |
| 5,512,250 A | * | 4/1996 | Betta et al. ................. | 422/173 |
| 5,611,214 A | | 3/1997 | Wegeng et al. | |
| 6,140,266 A | * | 10/2000 | Corrigan et al. ............ | 502/439 |
| 6,444,610 B1 | * | 9/2002 | Yamamoto .................. | 502/325 |

* cited by examiner

Primary Examiner—Cam N. Nguyen

(74) Attorney, Agent, or Firm—Joan Pennington

(57) ABSTRACT

A monolithic catalyst with micro-scale flow channels and methods of making such a monolithic catalyst are provided. The monolithic catalyst includes a plurality of thin catalyst walls. The walls have a set thickness in a range from 1 to 150 $\mu$m. The thin catalyst walls define a plurality of flow channels. A fugitive material is used to form the flow channels. The flow channels have a set width in a range from 1 to 200 $\mu$m. The flow channels are formed by an organic fugitive material, which burns off during processing. By using the thin catalyst walls and flow channels having a set width in a range from 1 to 200 $\mu$m, a reduced diffusion path length that molecules travel between the bulk gas and the active site is provided. Accelerating the mass transport thus improves the overall reaction rate, which allows processing of more reactants. Thus, the volume of the required catalyst is reduced, allowing more compact reactors. Fabrication methods involve simple, low-cost and scaleable procedures, allowing the flow channel and catalyst dimensions to be easily scaled to a requisite size for a given application. One fabrication method involves tape casting successive layers of fugitive and catalyst materials, and then firing to remove the organic binders and partially sinter the catalyst particles. The slurries can also be cast into thin layers using various processes, including screen printing, wet spraying and spin casting. Another fabrication method for fabricating a supported catalyst involves dipping a pre-shaped metal foil into a slurry containing an active catalyst powder, allowing the catalyst slurry to coat the foil evenly and allowing the catalyst slurry coated foil to dry. The catalyst slurry coated foil is dipped into a solution to form a fugitive coating layer, next the coated metal foil is cut into strips and formed into a selected shape.

26 Claims, 6 Drawing Sheets

200

210

FREE-STANDING MONOLITHIC CATALYST WITH MICRO-SCALE CHANNEL DIMENSIONS

The United States Government has rights in this invention pursuant to Contract No. W-31-109-ENG-38 between the United States Government and Argonne National Laboratory.

FIELD OF THE INVENTION

The present invention relates to a monolithic catalyst, and more particularly, relates to a free-standing or supported monolithic catalyst with micro-scale flow channels and catalyst walls and methods of making such a monolithic catalyst.

DESCRIPTION OF THE RELATED ART

Catalytic autothermal reforming of hydrocarbon fuels has been shown to be an attractive way of producing hydrogen for fuel cells. In automotive applications, it is desirable to develop a compact reactor to conserve space and weight. It is also desirable to use monolithic catalysts to avoid particle attrition and pressure gradients common to packed-bed reactors.

State of the art monoliths are based on the use of a metal or ceramic honeycomb support with channel widths as small as 0.5 mm. The active catalyst is typically applied to the monolith using a wash-coat procedure. However, these channel widths are too large and thus the path length that the reactants/products have to travel to/from the active catalyst site is long. Consequently, the process becomes mass transport limited and therefore not very effective for kinetically fast reactions, particularly for automotive applications such as the reforming of methanol or hydrocarbons for the production of hydrogen. Accelerating the mass transport improves the overall reaction rate, which allows processing of more reactants. Thus the volume of the required catalyst is reduced and leads to more compact reactors.

Microreactors have been shown to decrease the diffusion length and maintain good flow characteristics. Microreactors have been demonstrated in a large number of chemical processes including hydrocarbon fuel reforming. Microreactors are characterized by flow channel dimensions that range from the sub-micro to sub-millimeter scale. Microreactors are normally fabricated using micro-technology methods including lithography, wet chemical etching, laser ablation, micro-molding, and advanced mechanical cutting, milling and drilling.

U.S. Pat. No. 5,611,214 discloses a microcomponent sheet architecture where microscale unit processes are performed by microscale components. The sheet architecture includes a single laminate with a plurality of separate microcomponent sections or the sheet architecture includes a plurality of laminates with one or more microcomponent sections on each laminate.

An example of a microreactor fuel reformer, based on U.S. Pat. No. 5,611,214, has been demonstrated. This microreactor is fabricated by cutting channels into stainless steel sheets by either conventional machining or electrodischarge machining. The active catalyst powder is packed into the channels of the plate. These fabrication methods are expensive in terms of equipment and time. In addition, the benefit of the microchannel is lost since the active catalyst forms a packed bed, which increases the pressure drop. The metal substrate adds weight and volume to the reactor.

It is desirable to reduce or eliminate the problems associated with known reactors. The catalyst industry generally uses simple and inexpensive methods to process a wide variety of catalyst materials. It is desirable to develop an economical method to fabricate monolithic catalysts with micro-scale flow channels.

SUMMARY OF THE INVENTION

A principal object of the present invention is to provide a monolithic catalyst with micro-scale flow channels and methods of making such a monolithic catalyst. Other important objects of the present invention are to provide such methods and monolithic catalyst substantially without negative effect; and that overcome some disadvantages of prior art arrangements.

In brief, a monolithic catalyst with micro-scale flow channels and methods of making such a monolithic catalyst are provided. The monolithic catalyst includes a plurality of thin catalyst walls. The walls having a set thickness in a range from 1 to 150 $\mu$m. The thin catalyst walls define a plurality of flow channels. The flow channels are formed by a fugitive material. The flow channels have a set width in a range from 1 to 200 $\mu$m.

A monolithic catalyst of the invention is formed by making a flexible strip including a layer of catalyst material and a fugitive layer. The flexible strip allows strips to be cut and formed into selected shapes as needed for a particular reactor design. For example, strips can be rolled into a spiral cylinder or folded into a planar stack. The flow channels are formed by an organic fugitive material, which burns off during processing.

In accordance with features of the invention, using the thin catalyst walls and flow channels having a set width in a range from 1 to 200 $\mu$m, provides a reduced diffusion path length that molecules travel between the bulk gas and the active site. Accelerating the mass transport thus improves the overall reaction rate, which allows processing of more reactants. Thus, the volume of the required catalyst is reduced, allowing more compact reactors. Fabrication methods of the invention involve simple, low-cost and scaleable procedures, allowing the flow channel and catalyst dimensions to be easily scaled to a requisite size for a given application. One fabrication method involves tape casting successive layers of fugitive and catalyst materials, and then firing to remove the organic binders and partially sinter the catalyst particles. The slurries can also be cast into thin layers using various processes, including screen printing, wet spraying and spin casting. Another fabrication method for fabricating a supported catalyst involves dipping a pre-shaped metal foil into a slurry containing an active catalyst powder, allowing the slurry to coat the foil evenly and allowing the catalyst slurry coated foil to dry. The catalyst slurry coated foil is dipped into a solution to form a fugitive coating, and the coated metal foil is cut into strips and formed into a selected shape.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, fabrication methods and monolithic catalysts are provided having flow channel dimensions ranging from 1 to 150 μm and catalyst wall thickness ranging from 1 to 200 μm. The monolithic catalysts are free standing or supported. The channel catalyst walls include a self-supported catalyst material or a layer of catalyst deposited on a thin metal or ceramic strip for added strength. The monolithic catalysts are formed by making flexible strips containing a layer of catalyst materials and a fugitive layer. The strips are made flexible by incorporating a catalyst powder with organic binders and plasticizers. This flexibility allows the strips to be formed into a selected shape as required for a particular reactor design. The flow channels are formed by an organic fugitive layer, which burns off during processing.

Figure 1A:
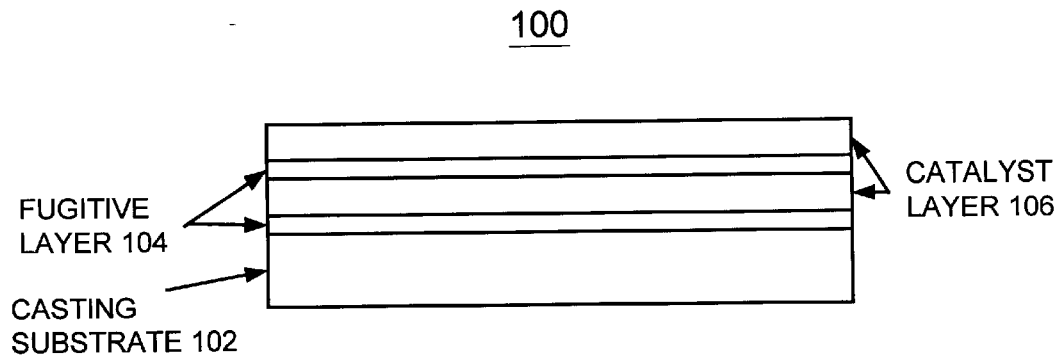
FIGS. 1A and 1B are diagrams respectively illustrating a monolithic catalyst in accordance with the preferred embodiments.

Having reference now to the drawings, FIG. 1A illustrates a monolithic catalyst in accordance with the preferred embodiment generally designated by the reference character 100. Monolithic catalyst 100 is fabricated on a smooth casting substrate 102. A fugitive layer 104 is cast on the casting substrate 102 and allowed to dry. A catalyst slurry is cast over the fugitive layer 104 and allowed to dry forming a catalyst layer 106. The thickness of the fugitive layer 104 defines the channel width, selectively provided in a range from 1 to 150 μm. The thickness of the catalyst layer 106 defines the thickness of the thin channel catalyst walls, selectively provided in a range from 1 to 200 μm. One example of the fabrication process involves tape casting of successive layers 104, 106 of fugitive and catalyst materials, and then firing to remove organic binders and partially sinter the catalyst particles. The fugitive and catalyst slurries also can be cast into thin layers using other conventional processes, including screen printing, wet spraying and spin casting. Monolithic catalyst 100 is a free standing including a self-supported catalyst material 106.

Figure 1B:
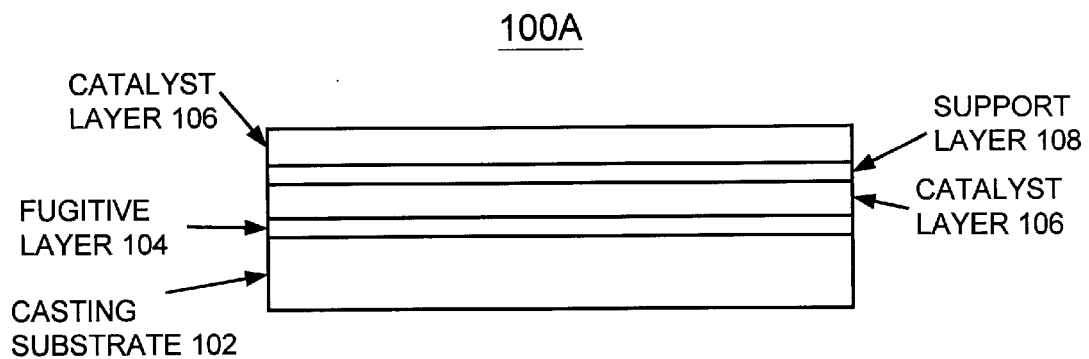

Referring also to FIG. 1B, there is shown a supported monolithic catalyst in accordance with the preferred embodiment generally designated by the reference character 100A. In FIG. 1B, the same reference characters are used for identical or similar components as used for the free standing monolithic catalyst 100 of FIG. 1A. Supported monolithic catalyst 100A includes a third, support layer 108 containing a supporting material that is cast over catalyst layer 106 and a fourth catalyst layer 106 is cast over the support layer 108.

Figure 2A:
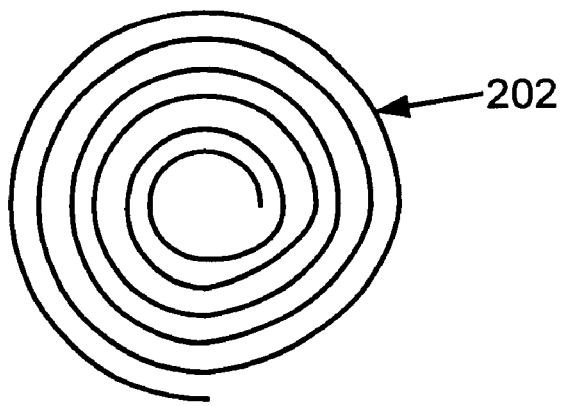
FIGS. 2A and 2B are diagrams respectively illustrating a monolithic catalyst in accordance with the preferred embodiments.
Figure 2B:
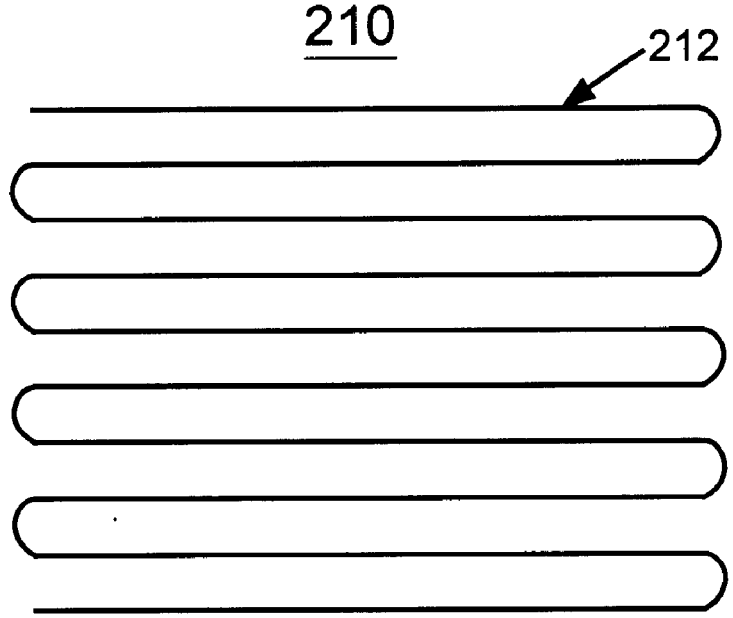

In the monolithic catalyst 100 and the supported monolithic catalyst 100A, the laminate structure or tape is peeled from the casting substrate 102 and cut into strips whose widths define a channel length. The strips are rolled into a spiral as shown in FIG. 2A or folded into a planar stack as shown in FIG. 2B until the desired diameter or tack height is obtained. The roll or stack is then loaded directly into a reactor tube to be fired in-situ or into a shuttle that could be inserted into the reactor after the firing process. The firing process involves a binder-burnout and a sintering step. The binder burnout is provided at temperatures ranging from 250 to 400° C. Heating ramp rates ranged from 20 to 100° C./h. The burnout process is provided in a flowing or stagnant air environment. After the removal of the organics, the structure is heated to sintering temperatures ranging from 700 to 1000° C. for 2 to 8 hours. Then the monolithic catalyst was tested in reforming conditions.

Referring also to FIGS. 2A and 2B, there are shown respective monolithic catalysts generally designated by the reference characters 200 and 210 in accordance with the preferred embodiments. Monolithic catalysts 200 and 210 have flow channel dimensions ranging from 1 to 150 μm and catalyst wall thickness ranging from 1 to 200 μm. The monolithic catalysts 200 and 210 can be either free standing or supported. The monolithic catalysts 200 and 210 can be formed of flexible strips containing a fugitive layer 104 and a self supported catalyst layer 106 or a catalyst layer 106 deposited on a support layer 108.

In FIG. 2A, the monolithic catalyst 200 is formed of flexible strips 202 containing a layer of catalyst material 106 and a fugitive layer 104. The strips 202 are rolled into a spiral cylinder until a desired diameter is obtained.

In FIG. 2B, the monolithic catalyst 210 similarly is formed of flexible strips 212 containing a layer of catalyst material 106 and a fugitive layer 104. The strips 212 are folded into a planar stack until a desired stack height is obtained. The fugitive layer 104 of flexible strips 202 and 212 is burned off during the firing process to define a desired channel width in a range from 1 to 150 μm.

Figure 3:
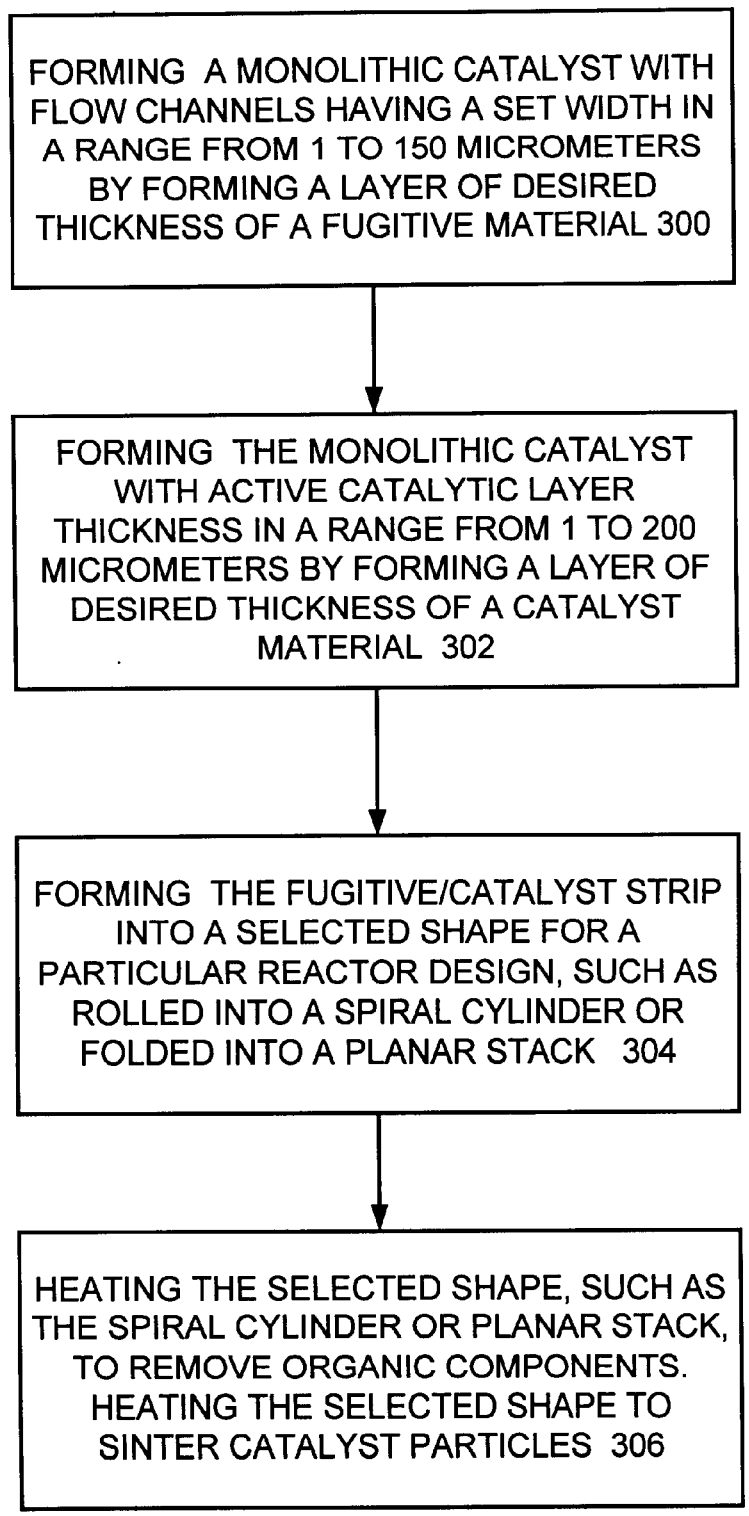
FIG. 3 is a diagram illustrating exemplary steps of a method for making monolithic catalysts in accordance with the preferred embodiment.

FIG. 3 illustrates exemplary steps of a method for making monolithic catalysts, such as monolithic catalysts 200, 210 with flow channels having a set width in a range from 1 to 150 μm in accordance with the preferred embodiment. First a strip with a layer of desired thickness of a fugitive material is formed as indicated in a block 300. An active catalyst layer having a thickness in a range from 1 to 200 μm is formed by a layer of desired thickness of a catalyst material on the fugitive layer as indicated in a block 302. A slurry containing an active catalyst powder having a surface area ranging from 1 to 50 $m^2/g$ is used to form the active catalyst layer. Then the strip containing the catalyst layer and fugitive layer is formed into a selected shape for a particular reactor design, such as by rolling the strip into the spiral cylinder monolithic catalyst 200 or folding the strip into the planar stack monolithic catalyst 210 as indicated in a block 304. The selected shaped spiral cylinder monolithic catalyst 200 or planar stack monolithic catalyst 210 is heated to temperatures in a range of 300 to 600° C. to remove the organic components and then heated to temperatures in a range of 500 to 1000° C. to sinter the catalyst particles as indicated in a block 306.

Figure 4:
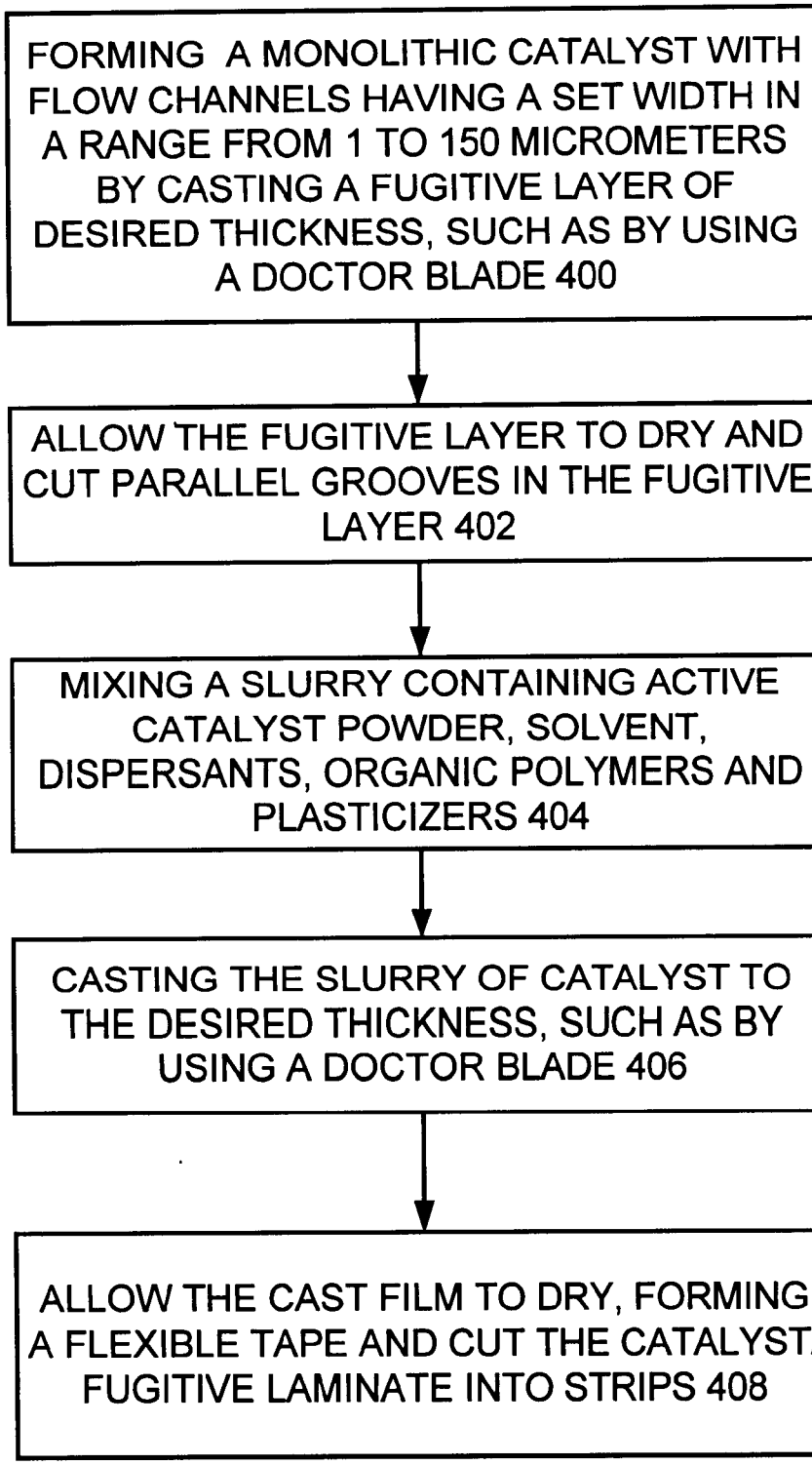
FIGS. 4, 5 and 6 are diagrams respectively illustrating further exemplary steps of methods for making monolithic catalysts in accordance with the preferred embodiments.

FIG. 4 illustrates further exemplary steps of a tape casting method for making monolithic catalysts, such as monolithic catalysts 200, 210 with flow channels having a set width in a range from 1 to 150 μm in accordance with the preferred embodiment. First a fugitive layer is cast to a desired thickness, such as by using a doctor blade as indicated in a block 400. For example, the fugitive layer was composed of 5–10 wt % polyvinyl butyral in the xylene-butanol solvent. The fugitive layer is allowed to dry, then parallel grooves are cut into the fugitive layer as indicated in a block 402. A slurry containing an active catalyst powder, solvent, dispersants, organic polymers and plasticizers is mixed as indicated in a block 404. For example, a catalyst powder contained doped-cerium oxide and a metal (surface area: 5–50 $m^2/g$). This powder (50–60 wt %) was dispersed in a solvent containing 78:22 by wt. Xylenebutanol (35–45 wt %) using polyvinyl pyrolidone (3–10 wt %) as the dispersant. After ball milling for 20 hours, the binder: polyvinyl butyral (1–5 wt %) and plasticizers: butylbenzylphthalate 1–5 wt % were added to the slurry. The viscosity of the slurry was adjusted by the solvent addition. The slurry of catalyst is cast to the desired thickness such as by using a doctor blade as indicated in a block 406. The application of the layer of catalyst slurry fills in the cuts in the fugitive layer, forming spacing supports for the channel walls. Then the cast film is allowed to dry, forming a flexible tape and the catalyst/fugitive laminate is cut into strips as indicated in a block 408.

Figure 5:
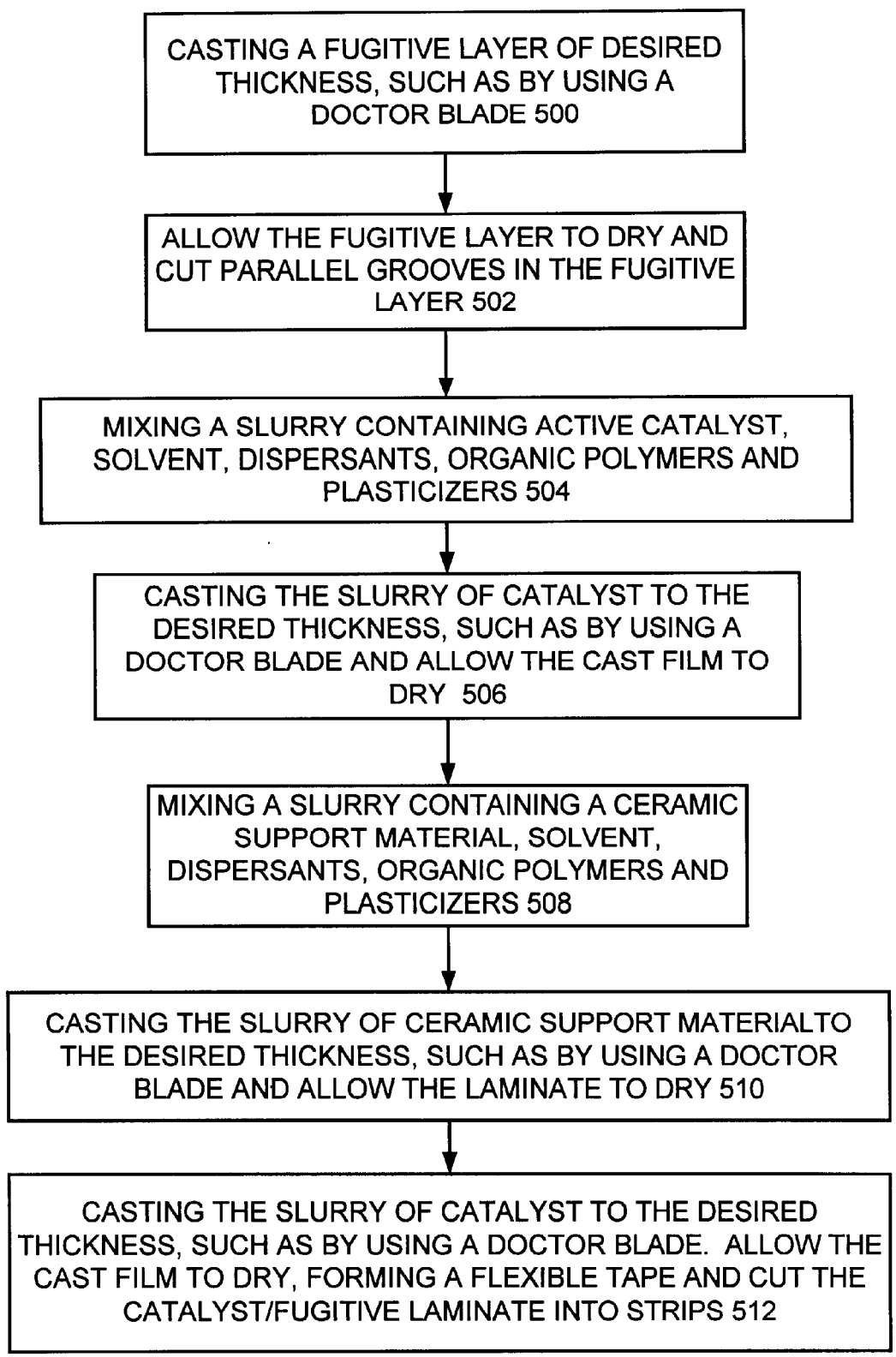

FIG. 5 illustrates further exemplary steps of another tape casting method for making monolithic catalysts, such as monolithic catalysts 200, 210 with flow channels having a set width in a range from 1 to 150 μm in accordance with the preferred embodiment. First a fugitive layer is cast to a desired thickness, such as by using a doctor blade as indicated in a block 500. The fugitive layer is allowed to dry, then parallel grooves are cut into the fugitive layer as indicated in a block 502. A slurry containing an active catalyst powder, solvent, dispersants, organic polymers and plasticizers is mixed as indicated in a block 504. The slurry of catalyst is cast to the desired thickness such as by using a doctor blade and the cast film is allowed to dry as indicated in a block 506. A slurry containing a support material, such as a ceramic and/or glass and/or metal support material, solvent, dispersants, organic polymers and plasticizers is mixed as indicated in a block 508. The slurry of ceramic support material is made of ceramic and/or glass support materials that will sinter at 500 to 1000° C. and provide mechanical strength to the structure. The slurry of ceramic support material is cast to the desired thickness such as by using a doctor blade and allowed to dry as indicated in a block 510. Then slurry of catalyst is cast to the desired thickness such as by using a doctor blade, the laminate film is allowed to dry, forming a flexible tape and the fugitive/catalyst/support/catalyst laminate is cut into strips as indicated in a block 512.

Figure 6:
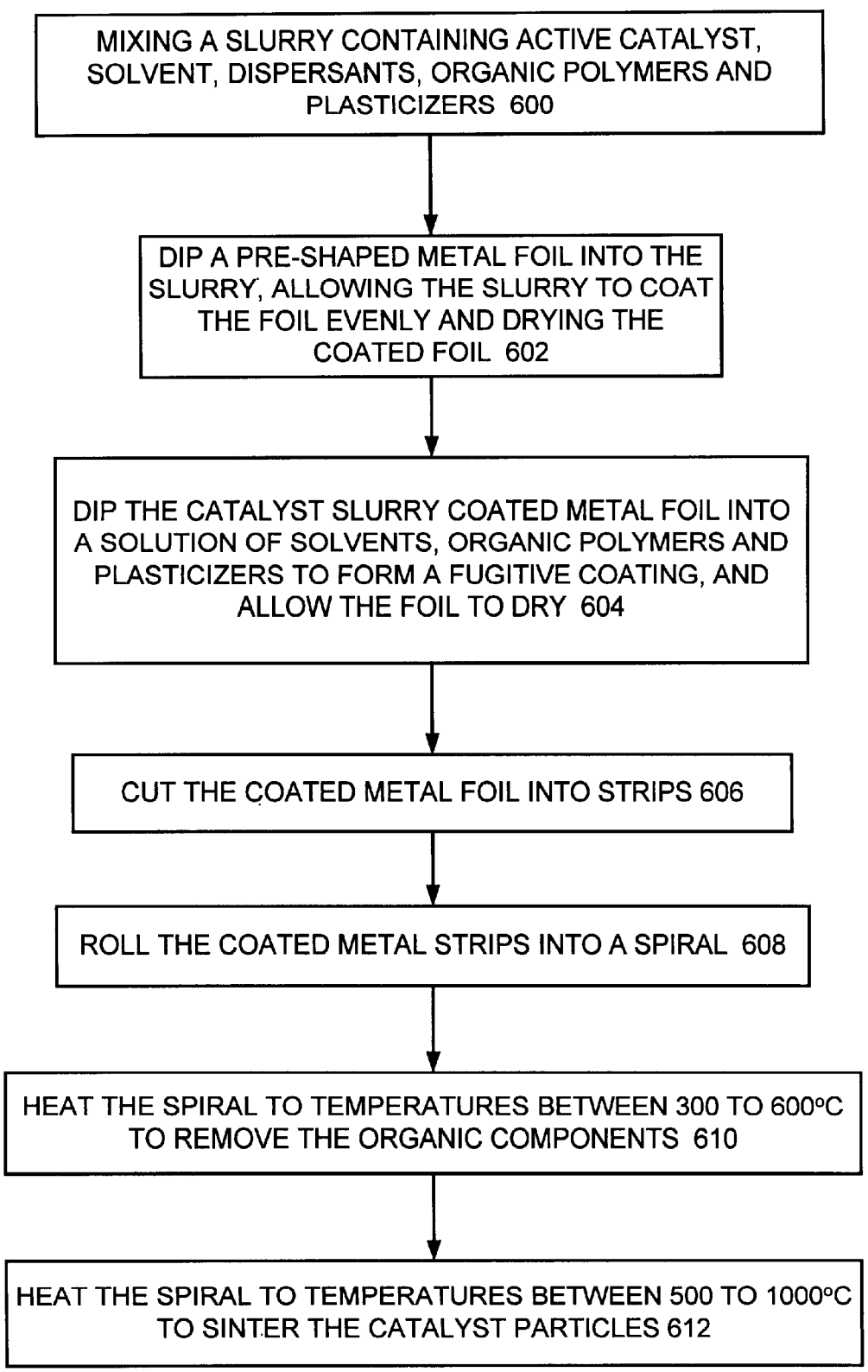

FIG. 6 illustrates further exemplary steps of a dip coating method for making supported monolithic catalysts, such as monolithic catalyst 200 with flow channels having a set width in a range from 1 to 150 μm in accordance with the preferred embodiment. A slurry containing an active catalyst powder, solvent, dispersants, organic polymers and plasticizers is mixed as indicated in a block 600. A pre-shaped metal foil is dipped into the slurry, allowing the slurry to coat the foil evenly and the coated foil is allowed to dry as indicated in a block 602. For example, stainless steel can be used as a metal substrate. The type of steel was found to be oxidation resistant at high temperatures from 950 to 1050° C. in ambient atmosphere. Also, the thermal expansion coefficient was $10\sim 11\times 10^{-6}/K$, which is compatible with the value of the catalyst coating. The surface of the steel was roughened by sandpaper or a sand blaster to ensure good mechanical contact between the ceramic and the metal foil. The catalyst coated metal foil is dipped into a solution of solvents, organic polymers and plasticizers to form a fugitive coating and the catalyst/fugitive coated metal foil is allowed to dry as indicated in a block 604. The coated metal foil is cut into strips as indicated in a block 606. Then the coated metal strips are rolled into a spiral as indicated in a block 608. The spiral is heated to temperatures in a range of 300 to 600° C. to remove the organic components as indicated in a block 610. Then the spiral is heated to temperatures in a range of 500 to 1000° C. to sinter the catalyst particles as indicated in a block 612.

The monolithic catalysts 100, 100A, 200, 210 of the preferred embodiments have been tested in a reactor to convert various hydrocarbon fuels, such as methane, gasoline and diesel into hydrogen and carbon oxides for fuel cells. The results show that the pressure drop and the temperature gradient increase at a slower rate at high space velocities as compared to that of a packed bed reactor. The monolithic catalysts 100, 100A, 200, 210 of the preferred embodiments also demonstrated greater hydrogen yield per unit volume of catalyst than the packed bed reactor.

The monolithic catalysts 100, 100A, 200, 210 of the preferred embodiments can be used for various applications. For example, monolithic catalysts 100, 100A, 200, 210 of the preferred embodiments could be used to accelerate the autothermal reforming reaction:

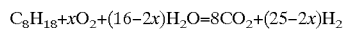

$$C_8H_{18}+xO_2+(16-2x)H_2O=8CO_2+(25-2x)H_2$$

Monolithic catalysts of the type of monolithic catalysts 100, 100A, 200, 210 of the preferred embodiments have been tested for the autothermal reforming ($C_nH_m$+air+$H_2O \rightarrow CO_2+CO+H_2+N_2$) of methane, iso-octane and diesel fuels to produce hydrogen and carbon oxides. The test apparatus consisted of a reactor tube centered in an electric furnace to maintain temperature control. Reactant gas streams were controlled by mass flow controllers and reactant liquids by HPLC pumps. The liquids were vaporized in an external vaporizer and then mixed with air before entering the top of the reactor. Product compositions exiting the bottom of the reactor were analyzed by gas chromatography and by online, $H_2$, CO and $CO_2$ analyzers. The results of autothermal reforming of natural gas, iso-octane and diesel, show that the monolithic catalyst in all cases produced a gas containing high concentration of hydrogen. Comparison of the monolithic catalysts of the preferred embodiments with a pack-bed catalyst show that the pack-bed catalyst has a much greater pressure drop. For example, the pressure drop over the pack-bed catalyst is greater than 6 times the monolithic catalyst. This pressure drop also initiates a temperature gradient across the pack-bed catalyst due to the holdup of reactants at the top of the bed. This leads to increased degradation rates of the catalyst. The monolithic catalysts of the preferred embodiments allows space velocities in excess of 230,000 per hour, lower pressure drop and temperature gradient.

Good success with a catalyst derived from solid oxide fuel cell technology, where the metal is a transition metal element and the substrate is an oxide ion conductor such as zirconia, ceria, or lanthanum perovskites. It has also been shown, that a good operating temperature is 700° C., which requires catalytic enhancement of the reaction rates. New catalyst formulations have been synthesized in which either the metal or the substrate composition was varied. The catalytic activity of these new catalyst formulations have been evaluated by measuring the hydrocarbon conversion and $H_2$ selectivity as a function of temperature and space velocity in a microreactor system. We have conducted life tests (>1000-h) to evaluate the stability of these catalysts towards deactivation. We have fabricated new structured forms of the catalyst, such as a monolith or a spiral microchannel configuration, to improve the catalyst durability and to minimize diffusional resistances. Using characterization techniques, such as Inductively Coupled Plasma (ICP), Energy Dispersive X-ray Spectroscopy (EDX), X-ray Photoelectron Spectroscopy (XPS)/Auger, Extended X-ray Absortion Fine Structure (EXAFS), X-ray Absorption Near Edge Spectroscopy (XANES), and Transmission Electron Microscopy (TEM), we have begun to develop a better understanding of the chemical and physical properties of the ATR catalyst and how these properties influence the catalytic activity. It is evident that some of the non-noble metals (e.g. nickel, copper, iron, cobalt) are as active as the more expensive platinum or palladium at temperatures as low as 700° C. Considering that the partial oxidation of methane using a Pt/alumina catalyst requires a reaction temperature of 1000° C. to achieve high conversion, it appears that an oxide ion conducting substrate may play a significant role in the reaction sequence. To better understand the role of the oxide ion conducting substrate, Pt supported on three different oxide ion conducting substrates (ceria, zirconia, and lanthanum gallate) were tested. The $H_2$ yield ranges from 34–60% (dry, $N_2$-free basis) for these different oxide ion conducting substrates. In comparison, the $H_2$ yield is less than 30% using a Pt/alumina catalyst under similar reaction conditions.

From an engineering perspective, a structured form of the ATR catalyst, such as a monolith or a microchannel configuration, is preferred over a pellet form to minimize potential problems, such as back-pressure buildup. Furthermore, if the reaction is severely mass-transfer limited a structured form of the ATR catalyst, that minimizes diffusional resistances, will have a higher activity per unit volume than a pellet form. The higher activity of the structured form of the catalyst will allow for higher processing rates (space velocities) which means that a reactor designed for use with a structured form of the catalyst will be smaller and require less catalyst than a reactor designed for use with pellets. For these reasons, we have developed a microchannel form of the catalyst. Using the ATR catalyst in a spiral microchannel configuration, a reformate containing a $H_2$ concentration of >50% (dry, N2-free basis) is produced at space velocities as high as 125,000 $h^{-1}$.

Another good example for advantages of the microchannel is a ZnO catalyst to remove sulfur in a gas stream. The monolithic catalysts can be beneficially used when the reaction is mass transfer limited such as $H_2S$ removal reaction by using ZnO. ZnO removes sulfur species at a gas gream by the following reaction:

$$ZnO+H_2S => ZnS+H_2O,$$

which is known to be mass transfer limited at the operating temperature of ~400° C. In preliminary studies, ZnO microchannel was able to reduce $H_2S$ level from 30 ppm to 1 ppm at 8000 gas hourly space velocity (/h).

To optimize the catalytic activity, an understanding of how the chemical and structural properties (e.g. metal particle size and particle size distribution, oxidation state of the metal, surface composition, and the interaction between the metal and the oxide) of the catalyst influence the reaction rate is required. Catalyst characterization studies, using techniques such as ICP, EDX, XPS/Auger, EXAFS, and XANES, to measure and investigate these properties have been initiated. The nature of the interaction between the metal and the oxide using ICP, EDX, and XPS/Auger and the metal particle size and particle size distribution using TEM are being investigated. In one study, small Pt clusters ($Pt_4$) 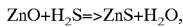 are present on Pt supported on an undoped ceria substrate, whereas, there is no evidence of Pt clusters (no Pt-Pt bonding) on Pt supported on a doped (Sm or Gd) ceria substrate. This suggests that the metal-support interaction is stronger between Pt on doped ceria than Pt on undoped ceria.

We have demonstrated that high hydrocarbon conversions and $H_2$ selectivity, comparable to those observed with Pt, can be achieved with certain less costly, non-noble metals supported on oxide ion conductors. Long-term reactor tests demonstrated that the Pt catalyst is stable with little for deactivation. We have developed structured forms of the catalyst, including a monolith and a spiral microchannel configuration and demonstrated that a reformate containing >50% $H_2$ (dry, $N_2$-free basis) can be produced at a space velocity of 125,000 $h^{31\ 1}$ using the microchannel configuration. We have observed that the addition of a dopant, such as Sm or Gd, to ceria results in a strong metal-support interaction that minimizes the formation of Pt clusters and strongly influences the reaction rate.

While the present invention has been described with reference to the details of the embodiments of the invention shown in the drawing, these details are not intended to limit the scope of the invention as claimed in the appended claims.

What is claimed is:

1. A monolithic catalyst comprising:
   a plurality of thin catalyst walls; said walls having a set thickness in a range from 1 to 200 μm; and
   said thin catalyst walls defining a plurality of flow channels; said plurality of flow channels formed by a fugitive material; said flow channels having a set width in a range from 1 to 150 μm.

2. A monolithic catalyst as recited in claim 1 wherein said plurality of thin catalyst walls is formed using a catalyst powder having a surface area ranging from 1 to 50 $m^2/g$.

3. A monolithic catalyst as recited in claim 1 wherein said plurality of catalyst walls includes a self-supported catalyst material.

4. A monolithic catalyst as recited in claim 1 wherein said plurality of catalyst walls includes a catalyst material on a mechanical support, said mechanical support is made from a selected one of ceramic, ceramic and glass, glass, or metal and said mechanical support sintering at a temperature in a range from 500 to 1000° C.

5. A monolithic catalyst as recited in claim 1 wherein said set thickness of said plurality of catalyst walls and said width of said flow channels are selected to reduce diffusion path lengths, whereby a processing rate for the monolithic catalyst is accelerated.

6. A monolithic catalyst as recited in claim 1 wherein said set thickness of said plurality of catalyst walls is defined by forming a layer of said set thickness including a catalyst material and a binding agent.

7. A monolithic catalyst as recited in claim 1 wherein said set width of said flow channels are defined by forming a layer of said fugitive material having a thickness of said set width.

8. A monolithic catalyst as recited in claim 1 wherein plurality of flow channels are disposed in a spiral shape.

9. A monolithic catalyst as recited in claim 1 wherein plurality of flow channels are disposed in a planar stack.

10. A method for fabricating a monolithic catalyst having a plurality of flow channels having a set width in a range from 1 to 150 μm and thin catalyst walls having a set thickness in a range from 1 to 200 μm comprising the steps of:
    forming the flow channels with a layer of fugitive material of a desired thickness in the range from 1 to 150 μm;
    forming the thin catalyst walls with a layer of catalyst material of a desired thickness in the range from 1 to 200 μm;
    forming the layers of fugitive material and catalyst materials into a selected shape.

11. A method for fabricating a monolithic catalyst as recited in claim 10 wherein the step of forming the flow channels with a layer of fugitive material of a desired thickness in the range from 1 to 150 μm includes the step of casting a fugitive layer to said desired thickness.

12. A method for fabricating a monolithic catalyst as recited in claim 11 further includes the steps of allowing said cast fugitive layer to dry and cutting parallel grooves in said cast fugitive layer.

13. A method for fabricating a monolithic catalyst as recited in claim 12 wherein the step of forming the thin catalyst walls with a layer of catalyst material of a desired thickness in the range from 1 to 200 μm includes the step of mixing a slurry containing an active catalyst powder and binding agents.

14. A method for fabricating a monolithic catalyst as recited in claim 13 wherein the step of mixing a slurry containing an active catalyst powder and binding agents includes the step of mixing a slurry containing an active catalyst powder, solvent, dispersants, organic polymers and plasticizers.

15. A method for fabricating a monolithic catalyst as recited in claim 13 further includes the steps of casting said catalyst slurry to said desired thickness over said fugitive layer and allowing said cast catalyst slurry over said fugitive layer to dry.

16. A method for fabricating a monolithic catalyst as recited in claim 15 further includes the steps of mixing a slurry containing a support material and casting said support slurry to said desired thickness over said catalyst layer and allowing said cast support slurry over said catalyst to dry and form a support layer.

17. A method for fabricating a monolithic catalyst as recited in claim 16 further includes the steps of casting said catalyst slurry to said desired thickness over said support layer and allowing said cast catalyst slurry over said support layer to dry.

18. A method for fabricating a monolithic catalyst as recited in claim 10 wherein said step of forming the layers of fugitive material and catalyst materials into a selected shape includes the steps of cutting the layers of fugitive material and catalyst materials into strips and forming said strips into said selected shape.

19. A method for fabricating a monolithic catalyst as recited in claim 18 wherein said step of forming said strips into said selected shape includes the step of rolling said strips into a spiral shape.

20. A method for fabricating a monolithic catalyst as recited in claim 18 wherein said step of forming said strips into said selected shape includes the step of folding said strips into a planar stack.

21. A method for fabricating a monolithic catalyst as recited in claim 10 wherein the step of forming the thin catalyst walls with a layer of catalyst material of a desired thickness in the range from 1 to 200 μm includes the steps of mixing a slurry containing an active catalyst powder and binding agents and dipping a shaped metal foil into said catalyst slurry.

22. A method for fabricating a monolithic catalyst as recited in claim 21 wherein the step of forming the flow channels with a layer of fugitive material of a desired thickness in the range from 1 to 150 μm includes the step of dipping said catalyst slurry coated metal foil into a solution of solvents, organic polymers and plasticizers to form a fugitive coating of said desired thickness.

23. A method for fabricating a monolithic catalyst as recited in claim 22 wherein the step of forming the thin catalyst walls with a layer of catalyst material of a desired thickness in the range from 1 to 200 μm including the steps of mixing a slurry containing an active catalyst powder and binding agents and dipping a shaped metal foil into said catalyst slurry and wherein the step of forming the flow channels with a layer of fugitive material of a desired thickness in the range from 1 to 150 μm including the step of dipping said catalyst slurry coated metal foil into a solution of solvents, organic polymers and plasticizers to form a fugitive coating of said desired thickness are used to coat an inside surface of a chemical reactor wall to provide additional catalyst surface and to prevent any undesirable reaction between main reactants and products and metals constituting said chemical reactor wall.

24. A method for fabricating a monolithic catalyst as recited in claim 21 includes the steps of cutting said coated metal foil into strips and wherein said step of forming said strips into said selected shape includes the step of folding said strips into a planar stack or rolling said strips into a spiral shape.

25. A method for fabricating a monolithic catalyst as recited in claim 10 further includes the step of heating said formed selected shape to temperatures in a range of 300 to 600° C. to remove the organic components.

26. A method for fabricating a monolithic catalyst as recited in claim 25 further includes the step of heating said formed selected shape to temperatures in a range of 500 to 1000° C. to sinter catalyst particles.

\* \* \* \* \*